United States Patent [19]
Pfister

[11] 3,908,152
[45] Sept. 23, 1975

[54] COORDINATE INDICATING DEVICE FOR INDICATING MEASURED VALUE PAIRS

[75] Inventor: Karl Pfister, Nurnberg, Germany

[73] Assignee: Kraftwerk Union Aktiengesellschaft, Mulheim (Ruhr), Germany

[22] Filed: Sept. 11, 1973

[21] Appl. No.: 396,249

[30] Foreign Application Priority Data
Sept. 22, 1972 Germany............................ 2246463

[52] U.S. Cl.... 315/169 TV; 315/169 R; 340/324 M
[51] Int. Cl.².......................................... H05B 37/00
[58] Field of Search.................. 315/169 TV, 169 R; 340/324 M

[56] References Cited
UNITED STATES PATENTS

| | | | |
|---|---|---|---|
| 2,892,968 | 6/1959 | Kallman | 315/169 TV |
| 2,925,532 | 2/1960 | Larach | 315/169 TV |

Primary Examiner—Robert Segal
Assistant Examiner—Lawrence J. Dahl
Attorney, Agent, or Firm—Herbert L. Lerner

[57] ABSTRACT

A luminescence plate is employed for coordinate indication of pairs of measured values. Electrode strips are applied at opposite sides of the luminescence plate and together form a coordinate grid system. When a pair of electrode strips are energized, the intersection point thereof on the luminescence plate lights up and indicates the position of the operating point in a characteristic curve diagram that is determined by a pair of measured values.

2 Claims, 3 Drawing Figures

COORDINATE INDICATING DEVICE FOR INDICATING MEASURED VALUE PAIRS

The invention relates to a coordinate indicating device for indicating pairs of measured values.

In many cases, such as for monitoring machines, for example, specific operating conditions must be maintained in order for example to preclude, through undue operating situations, an overloading of a machine or other devices connected or related thereto. It then often occurs that specific values of a measured quantity must be coodinated with a specific value of another measured quantity. For example, during operation of a pump, the overpressure produced by the pump may not drop below or exceed specific minimal and maximum values dependent upon the respective pump delivery.

For this purpose, measuring devices are required which directly present such a related pair of measured values, for example, pressure and delivery of a pump, in coordinate form. For example, a measurement point is formed by a measured value in horizontal direction and by another measured value in vertical direction, such as occurs, for example, also in cathode ray oscillographs.

It is an object of the invention to provide a coordinate indicating device which is able to dispense with the technical expense necessary for a cathode ray oscillograph and requires no moving parts for indicating a measured value pair in coordinate representation.

With the foregoing and other objects in view, there is provided in accordance with the invention, coordinate indicating device for indicating pairs of measured values by marking a respective point on a plane, including a luminescence plate, a multiplicity of closely adjacent and non-intersecting electrode strips disposed on opposite sides of the luminescence plate, the electrode strips on both of the sides together forming a coordinate grid system and a digital measured value transmitter having output terminals connected to the electrode strips of each of the sides, the measured value transmitter being constructed so that only one output terminal, respectively, is connectible to an alternatingcurrent source, in dependence upon the measured value.

Other features which are considered as characteristic for the invention are set forth in the appended claims.

Although the invention is illustrated and described herein as embodied in coordinate indicating device for indicating measured value pairs, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
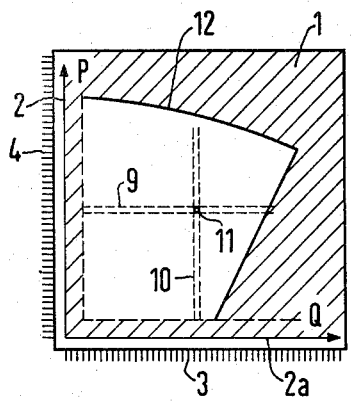
FIG. 1 is a diagrammatic elevational view of a luminescence plate forming part of and constructed in accordance with the invention of the instant application.

Referring now to the drawing and first, particularly, to FIG. 1 thereof, there is shown therein a luminescence plate 1 which is provided on the front side thereof with a multiplicity of transparent electrode strips 3 extending parallel to the ordinate 2 which represents, for example, the delivery of a pump, the electrode strips 3 having terminals or junctions projecting downwardly out of the luminescence plate 1, as viewed in FIG. 1. On the rear side of the luminescence plate 1, there are provided a multiplicity of electrode strips 4, which are not visible in FIG. 1, that extend parallel to the abscissa 2a which represents, for example, the pressure P of the aforementioned pump, the electrode strips 4 having terminals or junctions located at the left-hand side of the luminescence plate 1, as viewed in FIG. 1, and extending out therefrom. The electrode strips 3 and 4 at the front of and at the back of the luminescence plate 1, as viewed in FIG. 1, respectively, intersect at right angles and thereby form a coordinate grid system.

Figure 2:
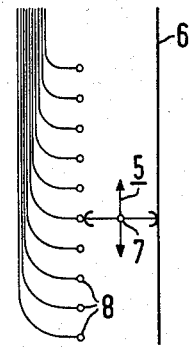
FIG. 2 is a schematic view of a segment switch and associated members also forming part of the invention.

The terminals of the electrode strips 3 and 4 are connected to output terminals of a segment switch 5, shown diagrammatically in FIG. 2 and formed of a bus bar 6, carrying alternating current, a movable contact 7 and output terminals 8. The output terminals 8 represent the outputs of a non-illustrated, conventional digital measured value transmitter, when the contact 7 connects a respective output terminal 8 to the bus bar 6 in accordance with the measured value that is to be indicated. Accordingly, a respective electrode strip 3 on the front side and a corresponding electrode strip 4 on the rear side of the luminescence diode 1, as viewed in FIG. 1, will be connected to alternating current and rather weakly illuminated, as indicated by the dotted double lines 9 and 10. At the intersection of the double lines 9 and 10, however, the electric field acting on the luminescence plate 1 is at its greatest so that the intersection point 11 is illuminated with special intensity or brightness. A diagram 12 painted or printed on the luminescence plate 1, permits recognition at a glance as to whether or not the intersection point 11 marking or registering the measured value pair is located within the allowable operating range of the respective feed pump.

Figure 3:
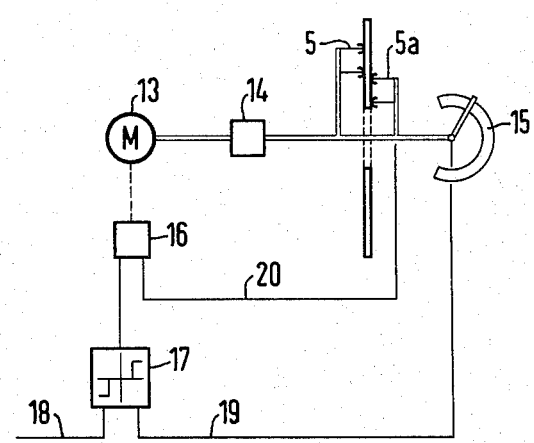
FIG. 3 is a schematic view of a complete embodiment of a coordinate indicating device according to the invention.

An embodiment of the measured value transmitter is shown in the schematic view of the coordinate indicating system of the invention illustrated in FIG. 3 which pertains to a situation wherein an analog measured quantity exists. A motor 13 is connected through a transmission 14 to a potentiometer 15 and to two segment switches 5 and 5a. The motor 13 is regulated or controlled by a relay combination 16 which, for its part, is switched on by a three-point trigger circuit 17 when a difference exists between the voltage at the measured value input 18 and at a comparator input 19. The voltage at the comparator input 19 depends upon the setting of the potentiometer 15. A lead 20 extends from the segment switch 5a to another input of the relay combination 16. If a voltage appears at the latter, a self-holding state, that becomes effective when the relay combination 16 is switched on, is interrupted. If the voltage changes at the measured value input of the three-point trigger circuit 17 to above the dead zone or band, the relay combination 16 becomes set, causes the motor 13 to start rotating in a specific direction and passes into self-holding state. Both the switch setting of the segment switches 5 and 5a as well as the setting of the potentiometer tap in the potentiometer 15 are thereby changed. Consequently, the output signal of the three-point trigger 17 and the motor 13 rotates further until the segment switch 5a reaches the next switch setting and the self-holding state of the relay combination 16 is cancelled or annulled. Assurance is thereby attained that the segment switch 5, which is connected to the terminals of the electrode strips 3 or 4 on one side, respectively, of the luminescence plate 1, always connects only one electrode strip to the bus bar 6 that is connected to an a-c. source.

Instead of the rectangular coordinate system shown in the embodiment of FIG. 1, oblique-angled, radiating or radial or other types of coordinate systems can be realized in embodying the invention of the instant application. It is also possible to represent two measured value pairs with one luminescence plate. In such a case, the luminescence plate 1 must be provided stripewise with illuminating materials of different colors. All electrode strips of each coordinate producing similarly colored illuminating points are connected, in such an embodiment, with a respective digital measured value transmitter. With such an embodiment of the device of the invention, only half of the indicating accuracy is attained, however, for equal or identical mutual spacing of adjacent electrode strips.

I claim:

1. In a coordinate indicating device having an electro-luminescence plate, each side of the luminescence plate having closely adjacent, non-intersecting electrode strips, the electrode strips of both sides together forming a coordinate system; a pair of segment switch means having output terminals and means for connecting the electrode strips on each side of the luminescence plate with the output terminals of a respective one of said pair of segment switch means, and means defining a diagram on the luminescence plate for indicating a region having predetermined limits, respective electrode strips on each of the sides of the luminescence plate, when connected to the respective segment switch means, having an illuminated intersection representing an operating point, whereby a visual indication of the location of the operating point of a device inside or outside of predetermined operating limits defined by said diagram is presented on the electro-luminescence plate.

2. Coordinate indicating device according to claim 1 wherein said luminescence plate is formed with adjacent lines of materials producing alternatingly different colors, and including a separate segment switch means for each of said colors on each side of said luminescence plate, the electrode strips for illuminating each color being connectible respectively to one of said segment switch means.

* * * * *